(12) United States Patent
Morwald et al.

(10) Patent No.: US 7,525,705 B2
(45) Date of Patent: Apr. 28, 2009

(54) CONTINUALLY VARIABLE DEMETALLIZATION OF METALLIZED FILMS AND SIMILAR OBJECTS

(75) Inventors: William C. Morwald, Langhorne, PA (US); Brian Mentz, Hamden, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 294 days.

(21) Appl. No.: 11/267,082

(22) Filed: Nov. 3, 2005

(65) Prior Publication Data

US 2006/0114530 A1 Jun. 1, 2006

Related U.S. Application Data

(60) Provisional application No. 60/624,813, filed on Nov. 3, 2004.

(51) Int. Cl.
*G03H 1/00* (2006.01)
*B42D 15/00* (2006.01)
(52) U.S. Cl. ............................................. 359/2; 283/86
(58) Field of Classification Search ..................... 359/2; 428/195.1
See application file for complete search history.

(56) References Cited

U.S. PATENT DOCUMENTS

| | | | |
|---|---|---|---|
| 5,044,707 A | | 9/1991 | Mallik |
| 5,085,514 A | * | 2/1992 | Mallik et al. .................... 359/2 |
| 5,128,779 A | | 7/1992 | Mallik |
| 5,142,383 A | | 8/1992 | Mallik |
| 5,145,212 A | | 9/1992 | Mallik |
| 5,200,253 A | * | 4/1993 | Yamaguchi et al. ...... 428/195.1 |
| 5,411,296 A | | 5/1995 | Mallik |
| 5,786,910 A | * | 7/1998 | Walters et al. ................... 359/2 |
| 5,856,048 A | * | 1/1999 | Tahara et al. .................... 430/1 |

* cited by examiner

*Primary Examiner*—Audrey Y Chang
(74) *Attorney, Agent, or Firm*—Allen, Dyer, Doppelt Milbrath & Gilchrist, P.A.

(57) ABSTRACT

A method of generating a variable demetallized pattern in a holographic web and a security device using such method. A holographic microstructure pattern is imparted to an oligomer disposed on a surface of a substrate. A metal layer, such as aluminum, is deposited to the holographic microstructure pattern of the substrate and then covered with a variable resist pattern. The variable demetallized pattern in the holographic web is then generated by removing the metal layer not covered by said variable resist pattern.

26 Claims, 5 Drawing Sheets

CONTINUALLY VARIABLE DEMETALLIZATION OF METALLIZED FILMS AND SIMILAR OBJECTS

RELATED APPLICATION

This application claims priority benefit under Title 35 U.S.C. §119(e) of provisional patent application No. 60/624,813 filed Nov. 3, 2004, which is incorporated by reference in its entirety.

BACKGROUND OF THE INVENTION

The demetallization of metallized films is a known process. It is a technique used in the packaging industry to create patterns of metallized areas on various packaging substrates. It is also used in the holographic security industry as a technique to enhance the security-providing attributes of holographic films and laminates. Other applications include flexible circuit board design, flexible antennas for RFID tags and similar patch style antennas, wavelength-specific electromagnetic shielding, and others where demetallization serves as a method to achieve desired functionality or graphic qualities. The technology described herein relates to the demetallization of holographic webs, but the disclosed technology is in no means limited to holographic webs only. Non-holographic metallized webs can be effectively processed using the disclosed technology, as well as substrates that are processed in sheet or other non-continuous forms. For simplification, the description is limited to metallized holographic webs. It should be understood that the security and other features created by the application of the technology to holographic webs can also, in part, be realized with the application of the technology to non-holographic materials as well.

The demetallization of metallized holographic films is used in applications where it is imperative that the holographic material be nearly impossible to duplicate by unauthorized persons. Such holographic films and products are used in currencies, security identification cards, passports, tamper indicating labels, various documents of value, and similar products. Importantly, demetallization of holographic overlaminates and other products creates a degree of transparency in the holographic substrate itself as a direct function of the amount of metal removed, further modified by the "negative" shape or pattern created by the removal of the opaque, reflective metal layer. This technique effectively counteracts physical contact copying of holograms due to the localized differences in diffraction efficiency and also provides see-through and other capabilities as is described in U.S. Pat. Nos. 5,044,707, 5,128,779, 5,142,383, 5,145,212 and 5,411,296, each of which is incorporated herein by reference in its entirety.

For example, if on a metallized holographic substrate the metal coating were to be removed in a fine checkerboard or other appropriate pattern, 50% of the substrate would remain reflective and 50% of the substrate would become effectively transmittive, on average. Although the holographic microstructure itself has not been removed in these transmittive areas, the impinging light is diffracted with such lower efficiency than it is in those areas that retain the reflective metal backing that there is no discernible trace of the holographic image. Under close examination it is seen that the holographic surface is still intact but since the entire holographic surface is typically brought into contact with an adhesive layer which adheres the hologram to the underlying document, the similarity of the diffractive indices of the non-metallized holographic surface areas and the adhesive layer serve to optically eliminate the diffractive surface. This is often referred to as "indexing out" a surface. Therefore, due to the elimination of the reflective and diffractive means in 50% of the active area and the preservation of the reflective and diffractive means in the remaining 50%, when such a demetallized film is overlaid on a document the holographic information and the document surface information are both simultaneously visible. In such an application, it is desirable to have at least some areas with a sufficiently fine checkerboard pattern so as to be below or near the resolution threshold of the human eye, or at least of a mean constituent size no greater than the smallest discrete object of information on the document. This prevents unwanted obscuring of document data with relatively large areas of opacity on the holographic overlay. With demetallized holographic overlay devices, still higher levels of document security can be obtained by creating very fine, anisotropic designs such as guilloche, text, company logos, or any other pattern that would be difficult to imitate due to its very high resolution and spatially localized diffractive effect. Another level of security can be achieved with the inclusion of demetallized watermark patterns. The widely accepted technique of holographic film demetallization consists of the following:

First, a holographic image is imparted onto or into a substrate using known means. This would, for example, consist of coating a web of polyester with an ultraviolet radiation-curable varnish and bringing a nickel holographic shim into contact with the varnish while a UV light cures, or hardens the varnish. The nickel holographic shim, being a transmission hologram created originally in photoresist, has on its surface a holographic microstructure that is cast into the varnish as the varnish is cured while in contact with the shim. This process is done repeatedly and/or continually on the web of polyester.

Continuing with the example, the roll of varnish-coated polyester is then coated with a thin layer of aluminum in a vacuum chamber to an optical density of approximately 1.8. The aluminum is applied directly to the holographic side of the web and conforms exactly to the microstructure, creating a reflecting transmission hologram that has very high diffraction efficiency.

This roll of metallized, holographic polyester is then printed with a patterned coating resist, where "resist" can be any form of a substance that is unreactive with corrosive (caustic or acidic) solutions or environments. In the case of an aluminum metallization, the resist must be especially non-reactive to caustics, such as NaOH. The printed design is typically applied to the metallized web with a flexographic, gravure, or lithographic printing technique. The design, then, like printed patterns on other materials, repeats with a certain frequency. The print cylinder circumference or more generally, the length of the print plate in the web direction typically dictates this frequency.

The printed web is then brought through a corrosive bath, such as a diluted NaOH bath at an elevated temperature, where the aluminum is etched from the surface only where there is no local protective overlaying of resist. The web is then brought through at least one rinse bath where the excess caustic is removed and neutralized (in the case of a NaOH bath, an HCl solution will produce salt water as an end agent when mixed proportionately with the NaOH).

Once the caustic has been neutralized and removed from the web, there is left behind a pattern of aluminum that exactly represents the footprint of the printed resist pattern. The resist pattern typically remains on the web. The demetallized, holographic web is then further processed as necessary.

The above technologies and similar variations are known and used in the security holographic industry to create difficult-to-counterfeit documents. Described hereinbelow is an inventive improvement upon the aforementioned and similar technologies. The improved technology is not limited to a pattern of demetallization that must continually repeat as a function of the printing plate or device. The improved technology is, in fact, continually variable.

SUMMARY OF THE INVENTION

Therefore, it is an object of the present invention to generate a demetallized pattern in the holographic web that is spatially independent of the printing means. The pattern would, ultimately, be variable to any degree so specified by the user prior to or at time of manufacture, and as such would create very unique and desirable products. For example, such a variation scheme could be to adjust the pattern of demetallization so there is a sequential order inherent to the pattern, whether it be self-evident (e.g. serialized integers) or coded indicia (e.g. encoded characters, progressive geometric patterning, bar codes, etc.) such that certain aspects of downstream manufacturing control, distribution, forensic verification, and security are all greatly enhanced.

In accordance with an embodiment of the present invention, a method generates a variable demetallized pattern in a holographic web. A holographic microstructure pattern is imparted to an oligomer disposed on a surface of a substrate. A metal layer, such as aluminum, is deposited to the holographic microstructure pattern of the substrate and then covered with a variable resist pattern. The variable demetallized pattern in the holographic web is then generated by removing the metal layer not covered by the variable resist pattern.

In accordance with an embodiment of the present invention, a security device comprises a holographic microstructure pattern on an oligomer disposed on a surface of a substrate, a metal layer deposited on the holographic microstructure pattern of the substrate, a variable resist pattern applied to the metal layer to provide a metallized holographic web, and a variable demetallized pattern formed in the holographic web by removing the metal layer not covered by the variable resist pattern.

"Personalized" holographic overlays or products that contain information specific to a relevant person, group, manufacturing lot, etc. can be effectively manufactured with such a variable demetallization technique of the present invention.

In accordance with an embodiment of the present invention, characters or shapes are distributed in such a manner that there is a purposeful interaction between the holographic pattern and the demetallization pattern. Such a purposeful interaction can be, for example, the masking or obscuring of manufacturing seams in the holographic image, or the generation of spatial "beat frequencies" in two patterns of mismatched frequency, where the holographic image or pattern is of one frequency and the demetallization image or pattern is of another.

In accordance with an embodiment of the present invention, characters or shapes are distributed in such a manner that there is a purposeful interaction between the base document information and the demetallization pattern.

In accordance with an embodiment of the present invention characters or shapes are distributed in such a manner that there is a purposeful interaction between the holographic pattern, the demetallization pattern, and the document pattern or information.

In accordance with an embodiment of the present invention, characters, shapes, or points are randomized or pseudo-randomized to generate interesting and useful masking, decorative, or functional effects.

In accordance with an embodiment of the present invention, feature size, density and location of the demetallized areas are specified in consideration of the effective opacity of the holographic substrate. This can be done to generate regions of transparency, or gradients of transparency to opacity. Specific macroscopic patterns can also be incorporated with the various zoning effects possible with variable demetallization in accordance with an embodiment of the present invention.

These and other objects of the invention are generated by the variably controlled deposition of a resist, or masking substance, to the metallized holographic web. This variable deposition is unlike traditional means of applying patterns to the holographic web for subsequent demetallization processes. Instead of repeating one pattern over and over, as is the case with typical printing presses, a variable resist deposition system allows continual alteration of the applied pattern to achieve the above and other results.

In accordance with an embodiment of the present invention, an ink-jet printing head in place of the traditional is utilized to apply infinitely variable resist patterns to a metallized holographic web. The ink-jet printing heads allow selective deposition of inks (or resists) and are directly addressable while in use, allowing continual modification of the applied resist pattern. The ink-jet heads can be computer controlled and therefore allow a degree of precision and speed necessary for efficient product manufacture. It is appreciated that there are various other printing technologies and imaging machines available to generate variable imaging of the present invention in addition to the ink jet printer, such as an "on-demand" printer, an "instant" printer or an Indigo printer from Hewlett-Packard.

In accordance with an embodiment of present invention, thermal transfer printing in a similar fashion is utilized to apply variable resist patterns to a metallized holographic web.

In accordance with an embodiment of the present invention, variable resist patterns are applied to a metallized holographic web to overcoat the entire web with resist and the resist is selectively removed via laser ablation or other mechanical, electromagnetic, or chemical means.

In accordance with an embodiment of the invention, the corrosive materials used to etch the metallic layer away can themselves be variably printed on the metallized web using the above techniques or by other means. The web is then rinsed and neutralized after the metal has been suitably etched. The technique of the present invention obviates the need to pre-print the web with a resist prior to exposure to a corrosive environment. That is, the present invention variably prints the pattern directly on the web with a corrosive agent.

These and other variable pattern printing techniques can be utilized in combination with or instead of the known traditional techniques used to apply static, or non-varying, resist patterns to metallized webs.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTIONS OF THE EMBODIMENTS

Figure 1:
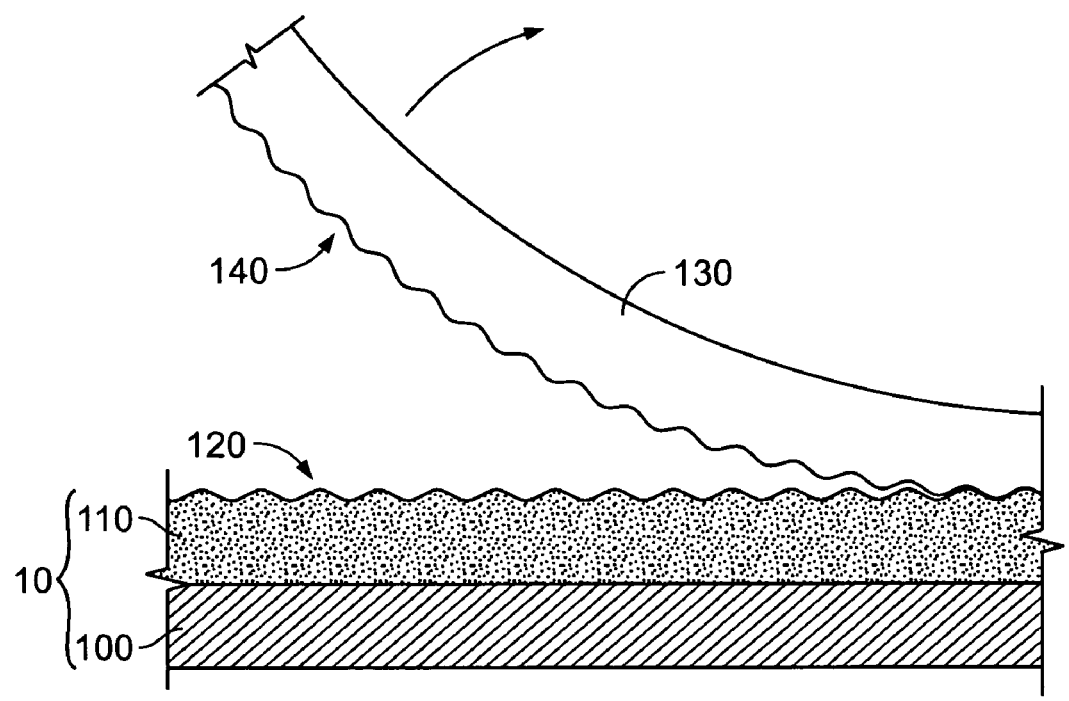
FIG. 1 is a diagram of a typical holographic substrate cross section.

Reference should be made to the drawing figures, on which similar or identical elements are given consistent identifying numerals throughout the various figures thereof.

FIG. 1 illustrates a sectional view of a holographic substrate 10, typical of that which is used in conjunction with the present invention. A PET base substrate 100 has disposed thereon a layer of oligomeric resin 110 that is cured while in intimate contact with a holographic stamping tool 130. The holographic stamping tool 130 imparts a holographic microstructure pattern 140 to the oligomeric resin, creating a negative pattern 120 in the surface of the resin. Once the resin layer or oligomer 110 has been cured and the holographic stamping tool 130 has been removed, the pattern 120 remains fixed in the top surface of said resin.

Figure 2:
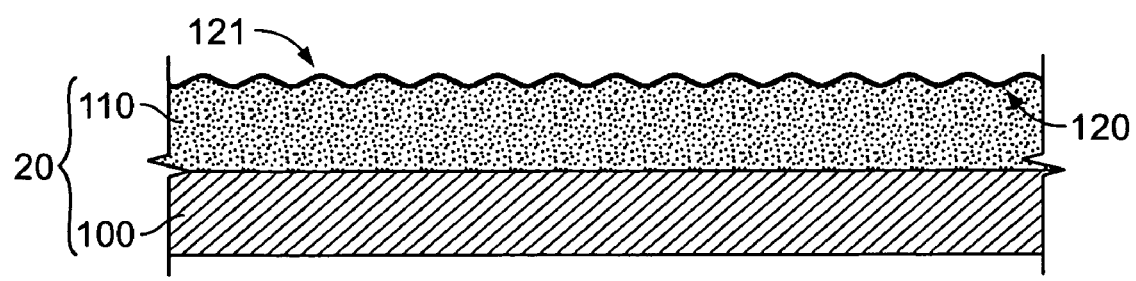
FIG. 2 is a diagram of the same holographic substrate coated with a reflective aluminum layer.

In a holographic substrate 20 illustrated in FIG. 2, a thin layer of aluminum 121 is affixed to the microstructure pattern 120 of the substrate 10. This serves to greatly increase the reflective and therefore, the diffractive properties of said microstructure.

Figure 3:
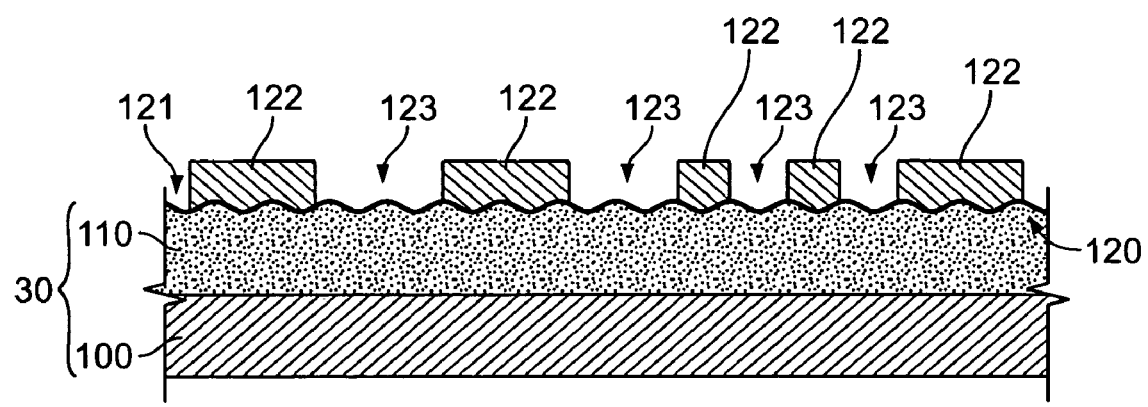
FIG. 3 is a diagram of the same substrate after a pattern of resist ink has been applied.

FIG. 3 illustrates a holographic substrate 30, wherein ink "dots" 122 have been applied to the top of the substrate 20, disposed upon the aluminum layer 121 in some pattern. These dots 122 fully wet and adhere well to the aluminum layer 121, such that immersion in a caustic solution prevents caustic from acting on the aluminum layer 121 directly beneath each of dots 122. In those areas 123 where there is no ink, the caustic solution will remove the aluminum layer 121.

Figure 4:
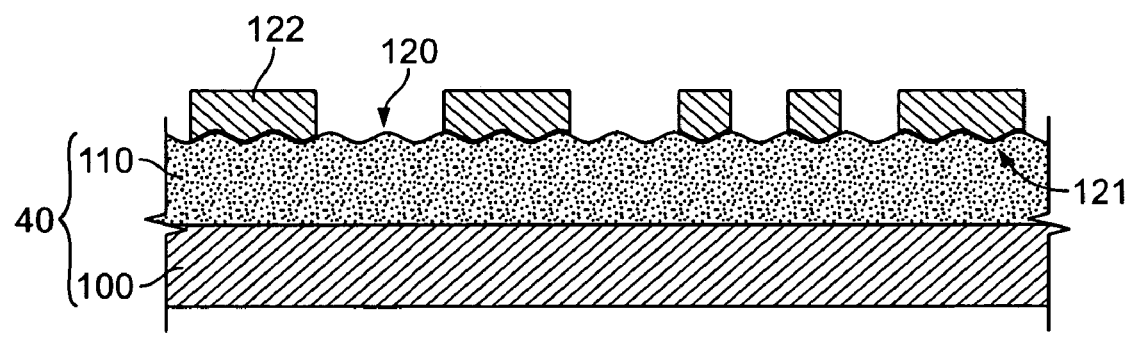
FIG. 4 is a diagram of the resist pattern-containing substrate after it has been processed in an etching solution.

A holographic substrate 40 is illustrated in FIG. 4, wherein the above-mentioned application of caustic solution has been used to remove the aluminum layer 121 in areas 123, leaving behind the aluminum layer 121 underneath dots 122.

Figure 5:
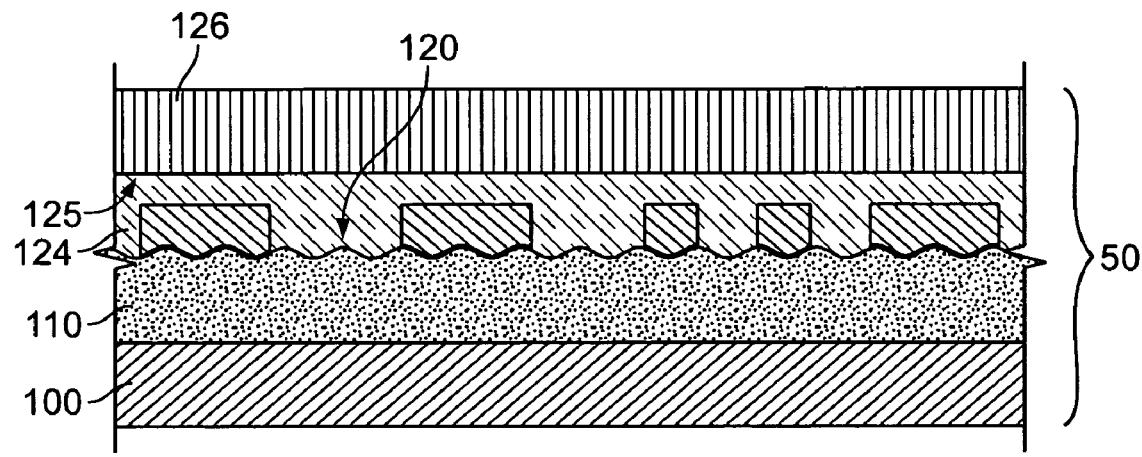
FIG. 5 is a diagram of the substrate after it has been affixed to a document with a layer of adhesive.

A security document 50 illustrated in FIG. 5 is an application of holographic substrate 40 of FIG. 4 in accordance with an embodiment of the present invention. An adhesive layer 124 is applied to the holographic substrate 40 so as to cover the ink dots 122 and the fill areas 123, coming into direct contact with the holographic microstructure pattern 120 on the top surface of the oligomer 110. It is appreciated that the adhesive 124 and the oligomer 110 have sufficiently close indices of refraction to effectively eliminate diffraction at their common boundary. Adhesive 124 serves to affix the holographic substrate 40 to a document 126, bringing the document surface 125 into immediate proximity with the design effected by the purposeful location of the dots 122.

Figure 6:
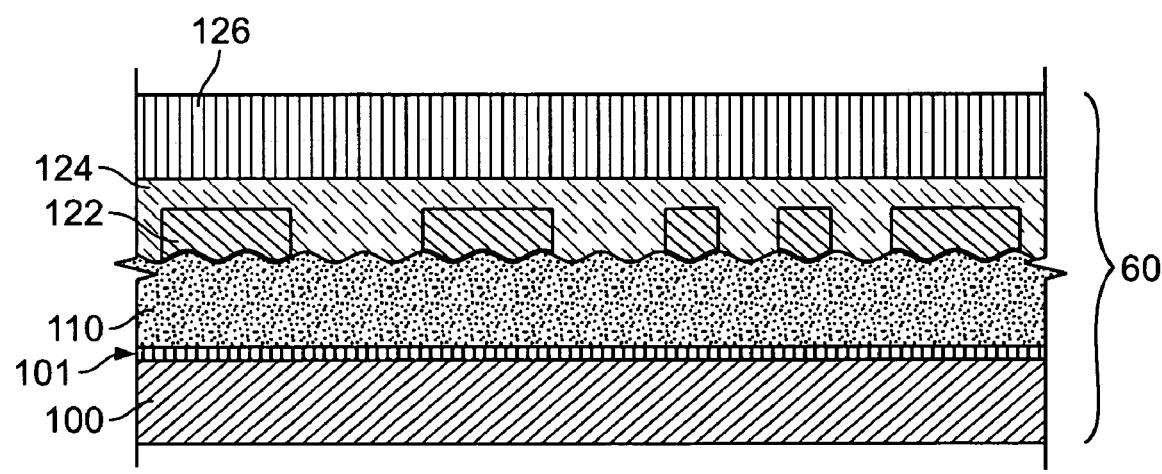
FIG. 6 is a diagram of a construction similar to that of FIG. 5 with the addition of a release layer between the cured oligomer and the base substrate.

A security document 60 illustrated in FIG. 6 is an alternative construction of the security document 50 illustrated in FIG. 5. In accordance with an embodiment of the present invention, the security document 60 comprises a release layer 101 has been disposed between the base substrate 100 and the oligomer 110.

Figure 7:
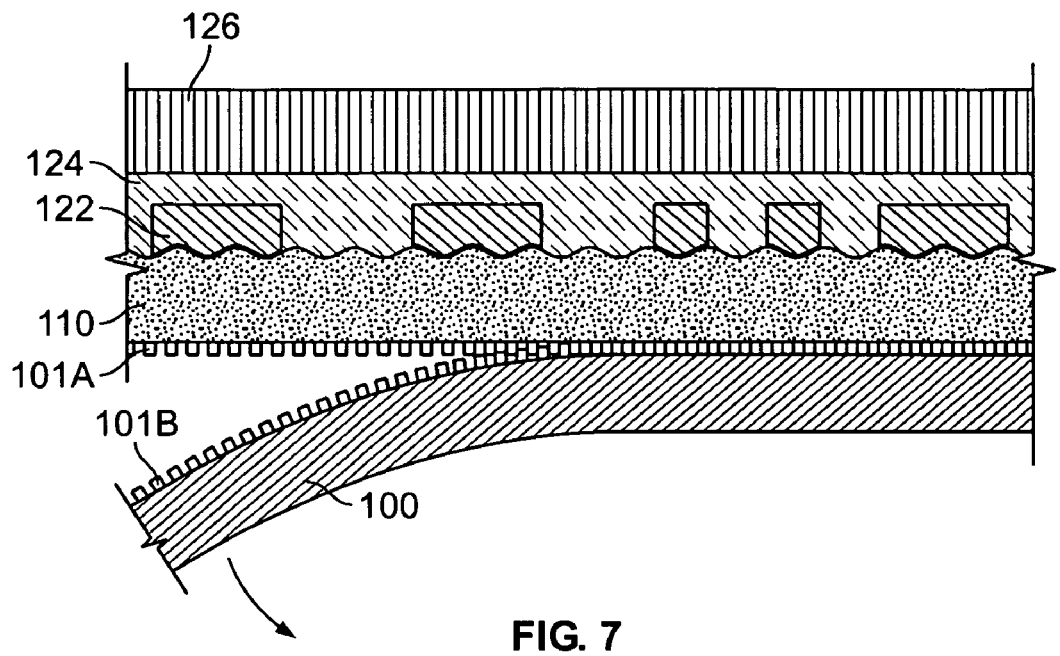
FIG. 7 is a diagram of the construction of FIG. 6 with the base substrate being separated from the holographic-bearing layer.

FIG. 7 illustrates the functional property of release layer 101, as base substrate 100 is shown being peeled back from the oligomer 110. A release layer 101a remains affixed to oligomer 110 and a release layer 101b remains affixed to base substrate 100. In accordance with an embodiment of present invention, the release layer 101 is selected in accordance with the preferred final construction of the security document 50.

Figure 8:
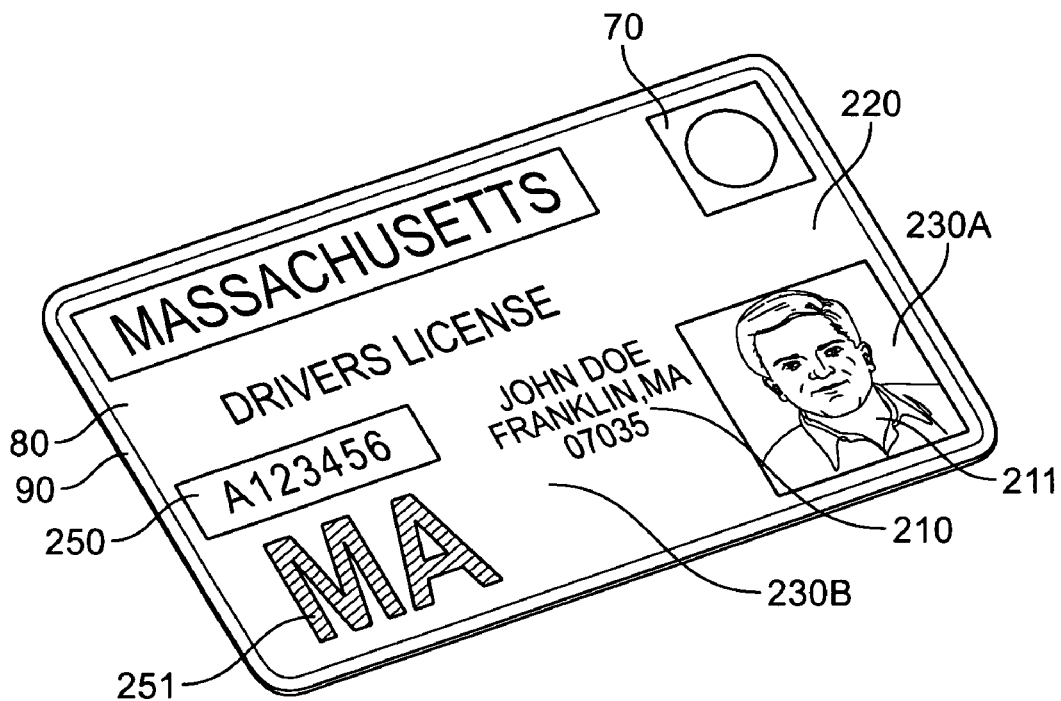
FIG. 8 is an exemplary diagram of a typical application of the variable demetallization technology.

An exemplary application in accordance with an embodiment of the present invention is shown in FIG. 8. A U.S. state driver's license 70 comprises a security overlaminate patch 80 manufactured in accordance with an embodiment of the present invention. A first holographic pattern 220 is designed to be registered to the footprint of the underlying PVC license substrate 90. The substrate 90 is printed with specific, cardholder related information 210. A holographic pattern 220 enhances the document information 210 and is designed to allow clear viewing of the information 210. A completely demetallized area 230a is located so as to allow the underlying photograph 211 of the driver to be readily viewable. A demetallization pattern 230b is of sufficient density as to allow the simultaneous viewing of the document information 210 and the holographic pattern 220. In this exemplary embodiment, a variable demetallization pattern 250 is of an alphanumeric string, indexed in the demetallization process so as to assign a unique identity to each security laminate patch 80. A variable demetallization pattern 251, which in this exemplary embodiment identifies the issuing state as Massachusetts. It is appreciated that during the manufacturing process, the variable demetallization pattern 251 can be designed to reflect the security overlaminate patch 80 issued to another state, for example New Jersey. In accordance with an embodiment of the present invention, both state variants of the security overlaminate patch 80 can be processed in parallel, one per "row" on base substrate 100. In this exemplary embodiment, the variable demetallization pattern 251 was varied "batch-wise" and the variable demetallization pattern 250 was varied "unit-wise".

Figure 9:
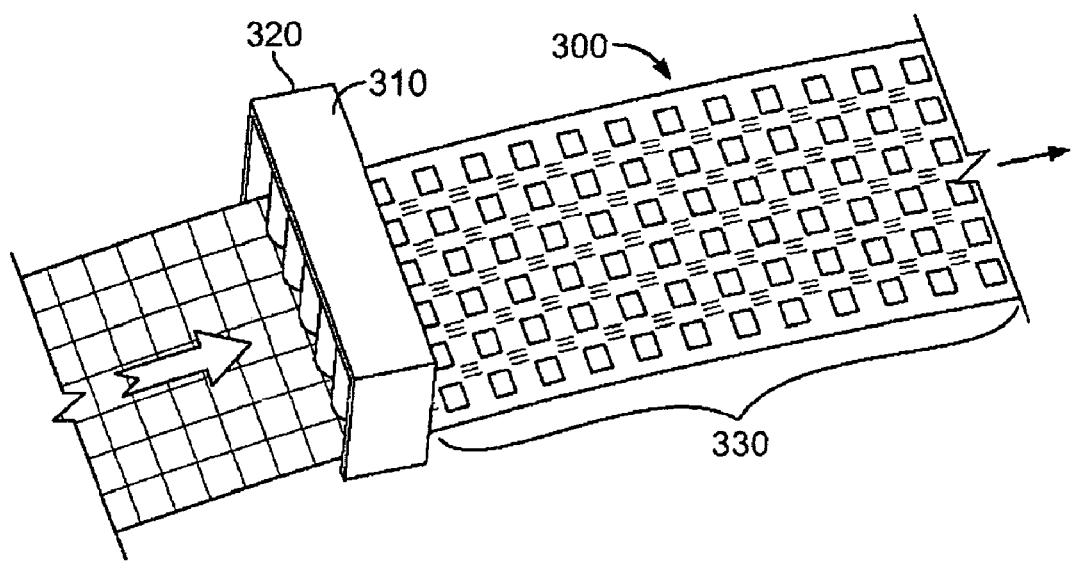
FIG. 9 is an exemplary diagram of part of a variable resist printing operation.

A simplified apparatus capable of applying the variable resist pattern in accordance with an embodiment of the present invention is illustrated in FIG. 9. A metallized holographic substrate 300 is steadily advanced in close proximity to an inkjet head array 310. The control system 320 modulates the application of resist ink through the inkjet head array 310 in synchronization with the web transport so as to generate the desired resist pattern 330.

Figure 10:
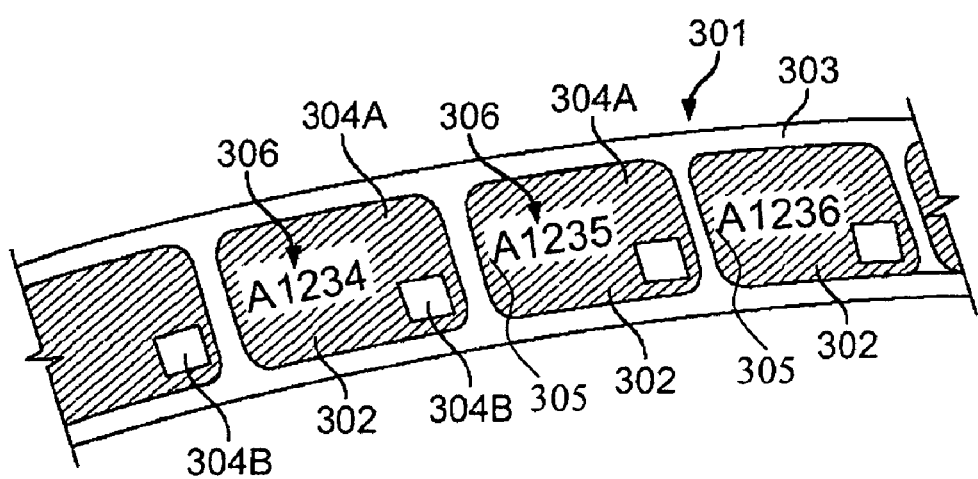
FIG. 10 is an exemplary diagram of a typical security document protected with a variably demetallized holographic overlaminate.

In accordance with an embodiment of the present invention, FIG. 10 illustrates a single row of security overlaminate patch 301 which consists of separate patches 302 disposed upon release liner 303. This construction is typically used for card overlamination in certain dye sublimation printers. The patches 302 contain a registered, fixed demetallization pattern 304, which consists of a pattern 304a, a 10% screen and a pattern 304b, a transparent region. The patches 302 also comprise a varying demetallized serialized code 305, located within a transparent block 306.

An exemplary application of the present invention is now described herein.

EXAMPLE

A 32" wide web of clear PET film (i.e., about ½ to 10 mil, preferably about 92 gauge) is coated with a UV curable oligomer to a thickness of about 1-20 microns and is brought into contact with a cylinder bearing a microstructured, holographic outer surface. The holographic design has been created to match the intended surface printing of a government-issued ID card. There is a government logo in one area of the design and a repeating element of the word "SECURITY" in another region of the design.

The tension in the web urges the coating against the holographic surface and is cured in situ via an ultraviolet light source. The cured oligomer separates easily from the holographic cylinder surface and remains affixed to the PET web. This hardened surface replicates the original holographic microstructure, albeit as a negative "cast". The holographic-bearing PET material is coated with aluminum in a vacuum metallizer and is mounted on a press containing an array of directly-addressable inkjet heads.

A computer program controls the distribution of ink from the inkjet heads and creates a pattern of alphanumeric serialization in register with the holographic image. Further, the inkjet heads create a non-varying region of about 30-60% screen in one portion of each holographic image, a completely opaque region in another portion, and a completely clear region in another portion. The clear region overlies the cardholder's photo, the opaque region surrounds the photo, and the screened area fills the rest of the design area. The varying alphanumeric stream is located along one side of the holographic image. The printed PET web is demetallized in the typical fashion and coated with a heat-activated adhesive layer. The web is processed in a proprietary fashion so as to allow release of single die-cut overlaminate patches as overlaminate film in a dye sublimation card printer.

The web is die cut and slit into single lanes. It is wound and supplied in roll form to the ID card issuer, who laminates the holographic overlaminate patch to a dye sublimation-printed ID card. Each badge's demetallized alphanumeric number is stored in the issuer's database and serves to crosslink the cardholder's ID with the card ID itself.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described herein. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of forming a plurality of laminate patches in a demetallized holographic web, comprising the steps of:

for each of the laminate patches, imparting a same holographic microstructure pattern to an oligomer disposed on a surface of a substrate;

depositing a metal layer to said holographic microstructure patterns of said substrate to provide a metallized holographic web;

applying a resist pattern to said metal layer of said metallized holographic web; and removing said metal layer not covered by said resist pattern so as to form a demetallized pattern on each of the holographic microstructure patterns whereby forming the plurality of laminate patches in the demetallized holographic web;

wherein, the demetallized pattern includes a fixed demetallization pattern and a variable demetallization pattern; and, for any first and second of the laminate patches, the fixed demetallization pattern of the first laminate patch and the fixed demetallization pattern of the second laminate patch are a same pattern; and the variable demetallization pattern of the first laminate patch is different from the variable demetallization pattern of the second laminate patch.

2. The method of claim 1, wherein the step of depositing comprises the step of depositing a layer of aluminum to said holographic microstructure pattern.

3. The method of claim 1, further comprising the step of applying adhesive to affix the laminate patches to documents.

4. The method of claim 3, wherein said variable demetallization pattern is registered with information in said document.

5. The method of claim 1, further comprising the step of disposing a release layer between said oligomer and said substrate.

6. The method of claim 1, further comprising the step of disposing a release layer between said oligomer and said substrate, wherein a portion of said release layer remains affixed to said oligomer and a remaining portion of said release layer remains affixed to said substrate when said substrate is peeled back from said oligomer.

7. The method of claim 1, wherein the step of applying comprises the step of applying resist ink through an inkjet head array of an ink jet printer.

8. The method of claim 7, wherein the step of applying resist ink comprises step of controlling the application of said resist ink and the movement of said metallized holographic web to generate said resist pattern.

9. The method of claim 1, wherein the variable demetallization pattern comprises at least one of the following: a serialized integer, an encoded character, a progressive geometric pattern, or a bar code.

10. The method of claim 1, the variable demetallization pattern comprises information specific to a person, group or manufacturing lot.

11. The method of claim 1, wherein said variable demetallization pattern is registered with said holographic microstructure pattern.

12. A batch of laminate patches, each comprising: a holographic microstructure pattern on an oligomer disposed on a surface of a substrate, wherein the holographic microstructure pattern is a same for all the laminate patches in the batch;

a metal layer deposited on said holographic microstructure pattern of said substrate;

a resist pattern applied to said metal layer for forming a demetallized pattern; and the demetallized pattern formed by removing said metal layer not covered by said resist pattern;

wherein the demetallized pattern includes a variable demetallization pattern and a fixed demetallization pattern so as to provide that, for any first and second laminate patches in the batch, the fixed demetallization pattern of the first laminate patch and the fixed demetallization pattern of the second laminate patch are a same pattern; and the variable demetallization pattern of the first laminate patch is different from the variable demetallization pattern of the second laminate patch.

13. The batch of laminate patches of claim 12, wherein said metal layer is a layer of aluminum.

14. The batch of laminate patches of claim 13, wherein a portion of said release layer remains affixed to said oligomer and a remaining portion of said release layer remains affixed to said substrate when said substrate is peeled back from said oligomer.

15. The batch of laminate patches of claim 12, wherein said substrate is affixed to a document.

16. The batch of laminate patches of claim 15, wherein said variable demetallization pattern is registered with information in said document.

17. The batch of laminate patches of claim 12, further comprising a release layer between said oligomer and said substrate.

18. The batch of laminate patches of claim 12, wherein said resist pattern is formed by applying resist ink through an inkjet head array of an ink jet printer.

19. The batch of laminate patches of claim 18, wherein said resist pattern is formed by controlling the application of said resist ink and the movement of said substrate.

20. The batch of laminate patches of claim 12, wherein the variable demetallization pattern comprises at least one of the following: a serialized integer, an encoded character, or a progressive geometric pattern.

21. The batch of laminate patches of claim 12, wherein said variable demetallization pattern is registered with said holographic microstructure.

22. The batch of laminate patches defined in claim 12, wherein the variable demetallization pattern comprises an alphanumeric pattern.

23. The batch of laminate patches in claim 12, wherein the variable demetallization pattern comprises a bar code pattern.

24. The batch of laminate patches defined in claim 12, wherein the laminate patches are laminated onto identification cards.

25. The batch of laminate patches defined in claim 12, wherein the fixed demetallization pattern covers 30-60% of the holographic microstructure pattern.

26. The batch of laminate patches defined in claim 12, wherein the substrates of the laminate patches form a continuous web.

* * * * *